Jan. 17, 1939.  G. DALKOWITZ  2,144,525
PROCESS OF MAKING DRY SHAVER PARTS
Filed Dec. 19, 1936
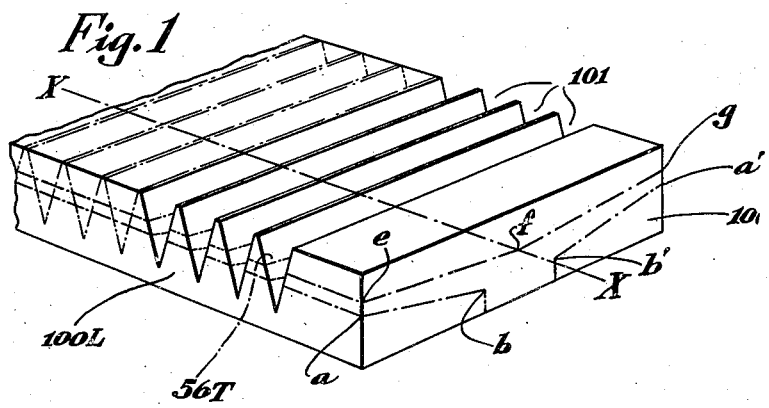
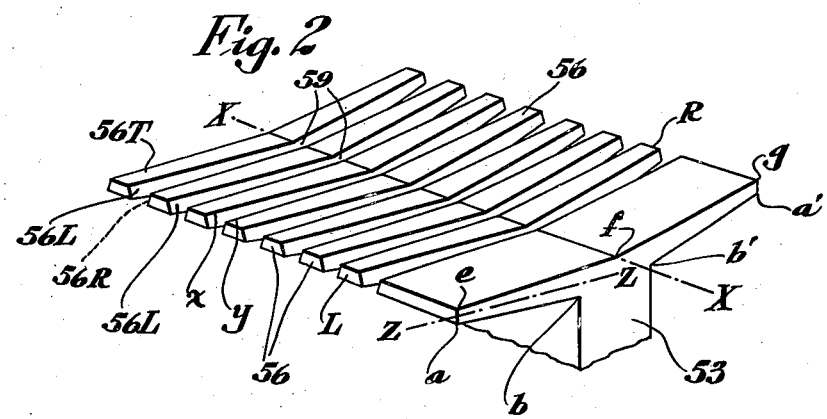
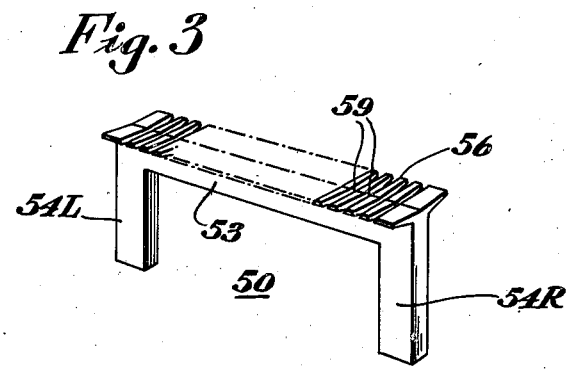
INVENTOR,
Godfrey Dalkowitz,
BY
ATTORNEY Patented Jan. 17, 1939

2,144,525

UNITED STATES PATENT OFFICE 2,144,525

PROCESS OF MAKING DRY SHAVER PARTS

Godfrey Dalkowitz, New York, N. Y., assignor to American Safety Razor Corporation, Brooklyn, N. Y., a corporation of Virginia Application December 19, 1936, Serial No. 116,681

3 Claims. (Cl. 76—104)

This invention relates to a process of making cutting members for the dry shaver shown and described in my copending application Ser. No. 114,297, filed Dec. 5, 1936, and more particularly the cutting member shown and described in the said application as a stationary cutting member for engagement with the face.

One of the objects of this invention is the devising of an economical procedure for manufacturing the said cutting member from bar stock material employing the least number of simple manufacturing operations.

For the attainment of this object and such other objects as may hereinafter appear or be pointed out, I have illustrated an embodiment of my invention in the drawing, wherein:—

Figure 1 is a perspective view of the bar stock diagrammatically showing the manufacturing operations;

Figure 2 is a perspective view of the cutting member, one portion of which is shown for illustrative purposes without the cutting teeth formed therein; and Figure 3 is a perspective view of the complete cutting member and shows the member in the form on which it is used in the aforementioned application.

The cutting member shown fully in Figure 3 is designated generally as 50 and comprises a bridge piece 53 and a plurality of teeth 56 (which will be more fully described hereinafter) and a left leg 54L and a right leg 54R. This invention is concerned with the formation of the teeth 56 and the bridge 53 from bar stock material and is not concerned with the manner of forming the said legs, 54R and 54L.

The cutting member proper is formed from a bar stock of material shown in perspective in Figure 1 and designated as 100. The first operation in the fabrication of the finished article from this bar is the cutting of a plurality of grooves 101 across the top face of the bar. The grooves may be of any desired and appropriate shape, for example they may be square grooves or they may be, as preferred and as shown in the figures, V-shaped grooves. The making of the V-shaped grooves gives certain desirable results, which will be hereinafter set forth. As most clearly seen from Figure 1 the transverse grooves extend downwardly a predetermined amount from the top of the bar.

The next step in the process is to remove the upper portion of the material of the bar, which may be done by a milling or grinding operation or otherwise. The depth of this material removing operation is made to increase from each side of the bar (the left side being designated in Figure 1 as 100L) towards the center of the member, more particularly towards the medial line running longitudinally of the bar and shown in dot and dash lines in Figure 1 and designated X—X. This material removing operation results in a dished or symmetrically downwardly sloped top surface which is clearly shown in Figures 2 and 3; and designated efg in Figures 1 and 2.

As a result of the two operations thus far described the top surface 56T and the side faces 56R and 56L of the teeth are formed. The upper edges of adjacent teeth (x and y, Figure 2) which define the space therebetween are inclined to each other towards the medial line X—X; this is the result of the fact that the transverse grooves 101 cut in the top surface of the bar are V-shaped and to the further fact that the upper portion of the material of the bar has been cut by a plane ef which slopes downward toward the medial longitudinal axis, so that points on facing upper edges (x and y) of the teeth will be closer to each other, the nearer they are to the medial axis X—X and, conversely, will be farther apart from each other, the nearer they approach the sides of the bar.

It will be further seen that the space between a pair of adjacent teeth located on one side of the member, for example, the left side, is in open communication with the opening between the corresponding pair of adjacent teeth on the right side of the member, by a plurality of slots, designated 59 in Figures 2 and 3, located in the top face of the member along the medial line X—X.

The third operation is to remove material from bottom portions of the bar stock material so as to form the bottom surfaces of the teeth and the bridge piece 53, by a milling, grinding or other operation. It will be seen from Figures 1 and 2 that the extent that the material is removed from the bottom portions of the block varies from the sides of the block toward the center thereof. More particularly, this material is removed so as to form bottom surfaces of the teeth which slope downwardly toward the center of the member. The bottom surfaces of the teeth on the left side of the member are designated ab (Figures 1 and 2) and a'b' on the right side.

The operation removing material from the bottom portions of the block differs from the operation removing material from the top of the block in a number of respects. Whereas the upper portions of the block are removed so that the inclined upper edges *ef* and *gf* meet at the point *f* which lies in the medial longitudinal line X—X, the bottom surfaces of the teeth *ab* and *a'b'* do not intersect but leave the portion of the material *bb'*, which defines part of the bridge piece 53.

The operation of removing the material from the bottom portions of the block completes the formation of the teeth, more particularly, defining the bottom surfaces thereof, and also results in the formation of the bridge piece 53. The lower edges of adjacent teeth which define the space therebetween are similar to the upper edges of the teeth in that, as already described in connection with the latter, the edges are inclined towards each other in the directions of the medial longitudinal axis of the member. A difference between the upper edges and the lower edges of the teeth should be noted and that is, whereas the upper edges result in the formation of slots 59 in the top face of the member connecting teeth spaces on the left of the member with spaces on the right of the member, the lower edges do not form any corresponding communicating slots. Instead, the lower edges of the teeth connect with portions of the bridge piece 53.

These operations complete the formation of the cutting member and result in a set of teeth along both sides of the member; a tooth in one set, for example, the tooth designated L (Figure 2) in the left set is integral with the corresponding tooth, for example R (Figure 2) of the right set of teeth at the medial axis X—X and the teeth L and R are further integral with the bridge piece 53. The pairs of integral teeth comprising a tooth on the right side and a tooth on the left side are spaced from each other by grooves 59 in the top face of the member connecting the teeth opening on both sides of the member.

The operation of removing material from the upper portions of the block results in the formation of a top face *e—f* (and *f—g*) which is at a predetermined angle; the operations of removing material from the lower portions of the block results in the formation of the underlying surfaces of the teeth *a—b*. It will be seen from the figures that the surface *a—b* is disposed at a greater angle than the top surface *e—f*. This results in the tapering of the teeth from the center of the member where they connect with the bridge piece towards the distal ends of the teeth.

The operations thus described, including the operation of forming the V-shaped grooves in the top surface of the material, results in teeth which are in the form of pyramidal frustums the axes of which (Z—Z, Figure 2) are inclined to the central bridge piece and the upper and underlying surfaces of which teeth taper (also in the direction of said inclined axis) from their juncture with the bridge piece towards the distal ends of the teeth. The facing sides of the pyramidal truncated teeth have two different inclinations or convergencies with respect to each other. The facing sides converge towards each other from the distal ends of the teeth towards the central bridge piece and also converge in a downwardly direction so that the upper edges of the facing sides form V-shaped openings of greater degree than the corresponding V-shaped openings formed by the lower edges thereof.

Having thus described my invention and illustrated its use, what I claim as new and desire to secure by Letters Patent, is:—

1. The process of making from bar stock material a dry shaver member having cutting teeth, which comprises the step of transversely cutting V-shaped grooves in the top surface of the bar stock and the step of cutting away the upper portion of the stock to an increasing depth starting from each side of the bar and reaching a maximum depth intermediate the sides which maximum depth however is less than the depth of the grooves and the step of cutting away lower portions of the stock to an extent sufficient to intersect the said grooves and at an increasing extent starting from each side of the bar and terminating from each side short of the center whereby two sets of cutting teeth shaped as pyramidal frustums are formed, the top and bottom surfaces of which slope downwardly toward the center of the member and whereby the facing sides of the adjoining teeth which define the space therebetween converge towards each other to form V-shaped openings, and converge in a downwardly direction also.

2. The process of making from a bar stock material a dry shaver member having cutting teeth, which comprises the step of transversely cutting V-grooves in the top surface of the bar stock and the step of cutting away the upper portions of the stock at a downwardly inclined angle of predetermined degree starting from each side of the bar and extending to the center of the bar and the step of cutting away lower portions of the stock to an extent sufficient to intersect said grooves and at an angle similarly inclined but of greater than the said predetermined degree the second mentioned cutting operation terminating short of the middle of the under surface at each side whereby two sets of cutting teeth shaped as pyramidal frustums are formed, the top and bottom surfaces of which slope downwardly toward the center of the member and taper toward the distal end of the teeth.

3. The process of making from a bar stock material a dry shaver member having a bridge piece provided with cutting teeth, which comprises the step of transversely cutting V grooves in the top surface of the bar stock and the step of cutting away the upper portions of the stock downwardly from each side of the bar toward the center of the bar to partly form teeth on both sides of the member and to dish the top surface of the member and the step of cutting away lower portions of the stock to an extent sufficient to intersect said grooves and to complete the formation of the said teeth and to form the said bridge piece.

GODFREY DALKOWITZ.